PORTABLE LIFTING AND/OR SPRING WINDING DEVICE

Filed Aug. 8, 1967 Sheet 1 of 4

INVENTOR.
LIONEL BIBEAULT
BY Salter & Michaelson
ATTORNEYS

July 1, 1969 L. BIBEAULT 3,452,964

PORTABLE LIFTING AND/OR SPRING WINDING DEVICE

Filed Aug. 8, 1967 Sheet 2 of 4

INVENTOR.
LIONEL BIBEAULT
BY Salter + Michaelson
ATTORNEYS

PORTABLE LIFTING AND/OR SPRING WINDING DEVICE

Filed Aug. 8, 1967

INVENTOR.
LIONEL BIBEAULT
BY Salter & Michaelson
ATTORNEYS

INVENTOR.
LIONEL BIBEAULT
BY Salter & Michaelson
ATTORNEYS

United States Patent Office 3,452,964

Patented July 1, 1969

3,452,964

PORTABLE LIFTING AND/OR SPRING WINDING DEVICE

Lionel Bibeault, Eaton St., Cumberland Hill, R.I. 02864

Filed Aug. 8, 1967, Ser. No. 659,104

Int. Cl. B66d *1/14;* F03g *1/08;* B65h *75/48*

U.S. Cl. 254—168 9 Claims

ABSTRACT OF THE DISCLOSURE

A portable lifting and/or spring winding device in which an elongated flexible tape is mounted for attachment to a fixed elevated support, the device being elevated to the support upon winding of the tape, and being operable to lower and lift loads at the elevated position, said device being further adapted to be removed from the elevated position for receiving a winding adapter thereon that is drivably interconnected to the shaft of a spring to be wound, wherein operation of the device is translated into winding motion of the spring.

*Background of the invention*

Although the present invention has application for a variety of uses, it is designed to be used particularly in the lifting of loads to an elevated position and for the winding of a spring located at the elevated position. Insofar as the background of the invention is concerned with respect to prior devices and procedures from which the present invention was developed, reference will be made to the apparatus and method employed in the assembly of large overhead industrial doors that are mounted in door openings of industrial plants and through which large equipment, such as trucks or the like, enter and leave. In this connection, the procedures known heretofore in constructing and assembling overhead industrial doors at the site of use have normally consisted of securing door sections together from the ground up until the required number of sections were assembled to complete the door unit. Since the door opening in which the usual overhead industrial door was positioned was relatively large, the securing of the sections in place as the door was built up required either lifting the sections manually or by using a pulley or winch device to lift the sections to the elevated position. When the door sections were lifted manually, at least two men were required in the assembly procedure, and considerable time and effort were necessary in order to assemble the sections in place. The use of a pulley or winch did reduce the manual labor involved, but such devices were cumbersome and oftentimes were not helpful in locating the door sections in the required position, and, therefore, considerable manual labor was still necessary in the assembly of the doors even with the use of a winch and pulley device.

After the door sections were assembled in edge-to-edge relation to complete the construction of the door unit, a tension spring was mounted at the uppermost end of the door opening and interconnected to a shaft so as to impart the required positive action of the door in the opening and closing thereof. Although mounting of the spring in place required some manual effort in lifting the spring to the elevated position, the real problem heretofore was in winding the spring to the required tension so that the door operatively connected thereto would move to the open and closed position with the necessary positive action. Heretofore, these large, heavy springs as used with overhead industrial doors have been hand wound, and it can be understood that considerable effort was required to wind the spring to the required tension, particularly since the springs as used with industrial doors are fairly heavy insofar as the size of the wire is concerned. Thus, winding of heavy springs having a wire size of one-quarter inch or more and convolutions measuring four inches or more necessitated considerable manual effort in the tensioning thereof and has been a most objectionable task in the installation of heavy overhead industrial doors.

*Summary of the invention*

The portable lifting and/or winding device embodied in the present invention is designed to overcome the difficulties experienced in assembling overhead industrial door sections and winding the springs associated therewith, although it will be understood that the present invention does have application in other fields. As described herein, the lifting and/or winding device includes a frame or housing having an electrically operated motor mounted therein and to which a speed reducer is operatively connected. Located intermediate the motor and speed reducer is a rotatable element in the form of a gear or reel; which is designed to receive a tape thereon that provides for lifting of the device to an elevated position or, when the device is mounted in the elevated position, is designed to lift loads to and from the elevated position. The gear reducer is so designed that the rotational speed of the rotatable element is reduced to the point wherein the lifting and lowering of the device or the loads to and from the elevated position are conveniently controlled.

The device is unique in that it is actually employed to lift itself to the elevated position, and once it is secured to a fixed support in the elevated position, it may be employed to lift or lower loads as required. In the installation of an overhead door construction, the device is employed to lift the door sections in place one upon the other, and after the door sections are mounted in position, the device may then be employed for lifting the required tension spring to the uppermost end of the door opening in which the door sections are installed. The device is then employed as a winding unit and is removed from the fixed elevated position and has operatively connected thereto a special adapter that is designed to provide for winding of the tension spring. In this connection, a special gear train interconnected to the drive assembly of the device is further adapted to be interconnected to the shaft of the tension spring. Operation of the drive assembly then causes the tension spring to be wound in the required manner. A special feature of the device provides for locating the adapter intermediate the ends of the spring shaft. This is accomplished by forming the gear of the gear train that is mounted on the spring shaft with a removable segment that exposes the interior thereof. The gear may then be mounted on the shaft of the tension spring intermediate of the ends thereof and the segment reinserted in place for locking the adapter to the spring shaft, whereby operation of the device thereafter results in winding the spring to the required tension.

Accordingly, it is an object of the present invention to provide a portable lifting and/or winding device that is employed in the lifting of loads to an elevated position and that is further adapted to wind a tension spring to a required tension.

Another object of this invention is to provide a portable lifting and/or winding device that is employed for the lifting of large industrial door sections into place and that further includes an adapter that is operable to wind a tension spring as associated with the completed door assembly.

Still another object is to provide a gear having a removal segment portion that provides for mounting of the gear on a shaft intermediate the ends thereof.

Other objects, features and advantages of the invention will become apparent as the description thereof proceeds when considered in connection with the accompanying illustrative drawings.

*Description of the drawings*

In the drawings which illustrate the best mode presently contemplated for carrying out the present invention.

*Description of the invention*

As will be described hereinafter, the portable lifting and/or winding device of the present invention has particular application in the assembly of an overhead door construction, wherein the individual door sections are relatively heavy and the tension springs associated therewith are of substantial size. However, it will be understood that when the invention is employed for lifting and/or lowering loads from an elevated position, the use of the device is not limited nor is it restricted just to the assembly of an overhead door construction.

Figure 1:
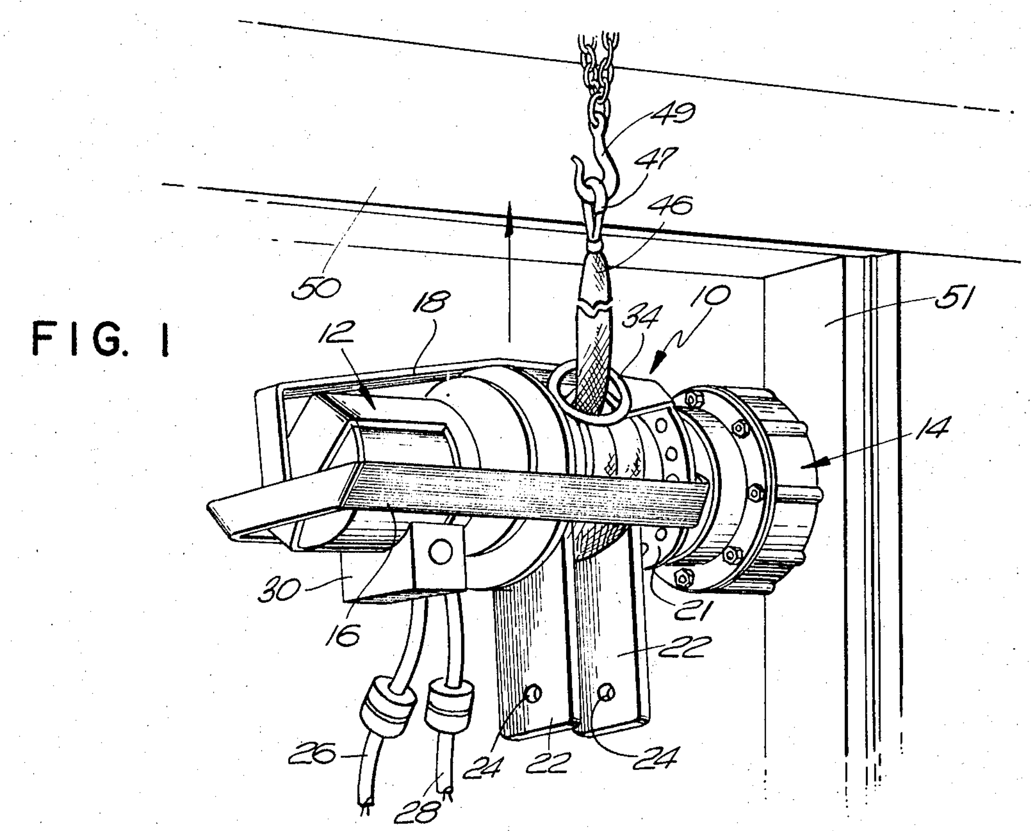
FIG. 1 is a perspective view of the lifting unit embodied in the present invention showing the movement thereof to an elevated support.
Figure 2:
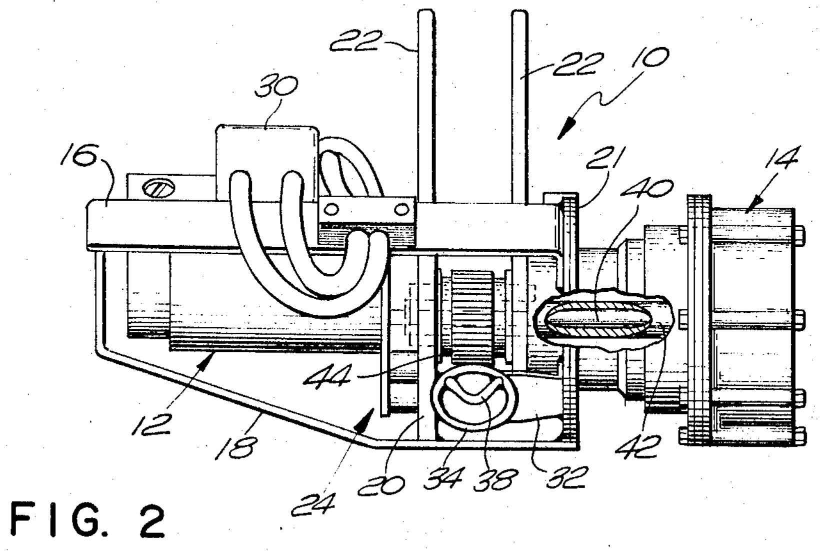
FIG. 2 is an elevational view, with parts shown in section, of the lifting unit.

Referring now to the drawings and particularly to FIGS. 1 and 2, a lifting unit is generally indicated at 10 and includes a housing or frame having an electric motor 12 mounted on one end thereof and a speed reducer 14 mounted on the opposite end thereof. Interconnecting the motor 12 and speed reducer 14 and formed as part of the frame are braces 16 and 18. Also mounted on the frame of the unit are coaxially located spaced plates 20 and 21, while projecting outwardly of the frame at approximately the midpoint thereof are spaced parallel mounting plates 22 having openings 24 formed therein; the purpose of which is to receive an adapter assembly thereon as will hereinafter be described. Any conventional electrical connections may be employed for electrically connecting the motor 12 to a suitable source of power and as shown in FIG. 1, conductor leads 26 and 28 extend into a junction box 30 that is mounted on the motor 12. Extending between the parallel plates 20 and 21 are a pair of brackets, one of which is indicated at 32 in FIG. 2, and to which are secured rings 34 and 36. The ring 34 has a V-shaped bar 38 joined interiorly thereof to define a reduced eyelet therein which as will be described receives a tape when the unit 10 is to be moved to an elevated position and thereafter employed for lifting loads.

Although not shown in detail the speed reducer 14 is conventional in construction and is drivingly interconnected to the motor 12 through a central drive shaft 40. The drive shaft 40 drives through the speed reducer 14 to a coaxial shaft 42 that projects from the speed reducer 14 through the parallel plates 20 and 21 and is journaled for rotation therein. Mounted on the coaxial shaft 42 for rotation therewith is a rotatable element as defined by a gear 44, the rotational speed of the shaft 42 and the gear 44 having been greatly reduced by the speed reducer 14 from that of the rotational speed of the motor 12. Thus, it is seen that when the motor 12 is energized, the gear 44 will be rotated in accordance with the speed reduction ratio as defined by the speed reducer 14.

Figures 3, 4, 5, 6, 7:
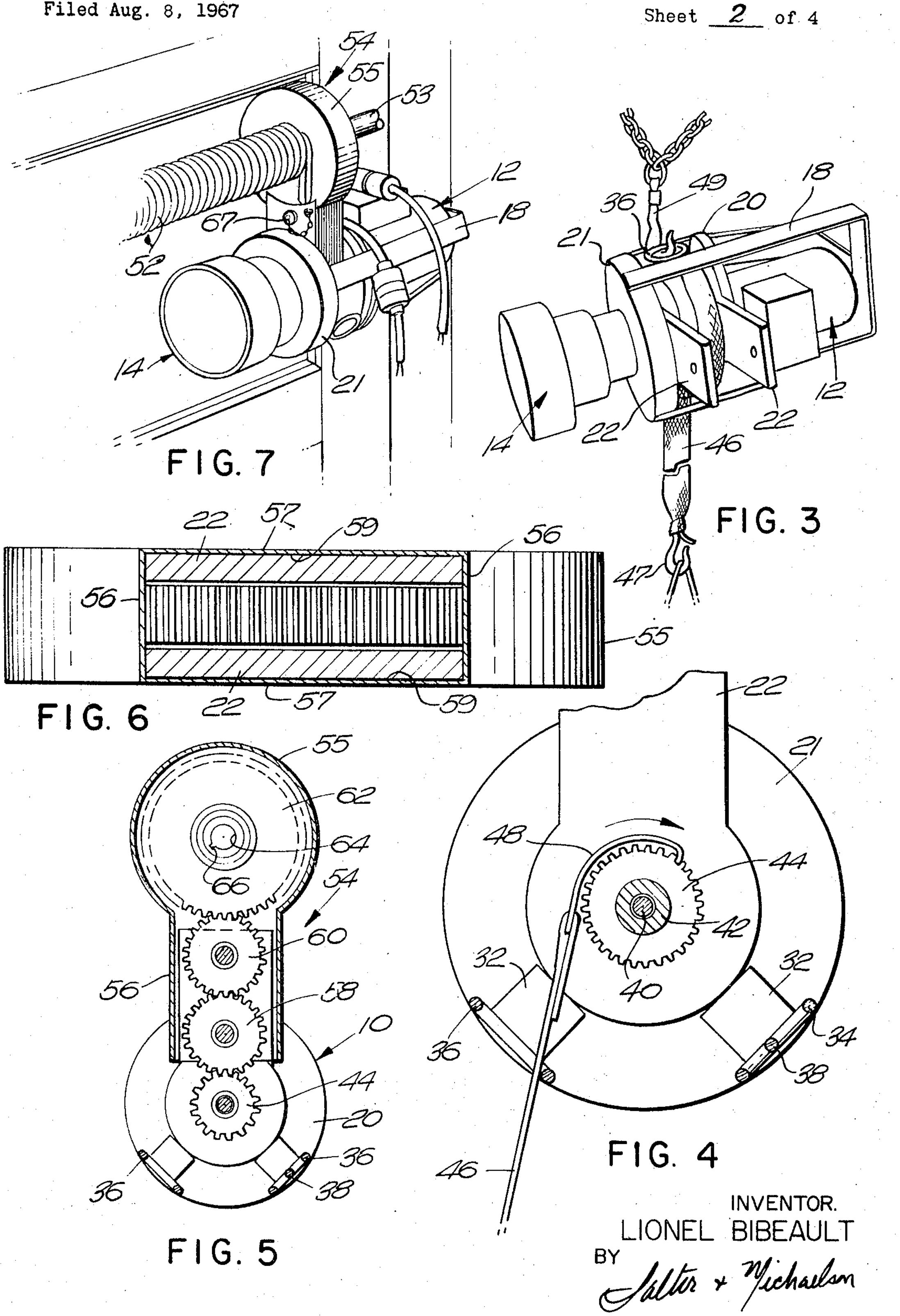
FIG. 3 is a perspective view showing the location of the lifting unit as mounted in the elevated position, in which position it is adapted to lift and lower loads thereto and therefrom.
FIG. 4 is a vertical sectional view taken centrally of the lifting unit.
FIG. 5 is a vertical sectional view of the lifting unit and the winding adapter that is attached thereto.
FIG. 6 is a vertical sectional view of the adapter with the mounting plates of the lifting unit located in the adapter pockets.
FIG. 7 is a perspective view of the combination unit showing the position thereof as mounted on a spring shaft during a spring winding operation.

It will be further observed that the motor 12 and the speed reducer 14 are so located with respect to the frame of the unit that the approximate midpoint thereof, or that point at which the gear 44 is located, defines the approximate center of gravity of the unit. Since the unit is adapted to be elevated to a fixed support, it is important that this center of gravity be established approximately at the location of the gear 44, particularly since it is the gear 44 that cooperates with a winding tape to move the unit to the elevated position. After the unit is moved to the elevated position it is then secured to an elevated support and thereafter employed as a winch or lifting device. For this purpose, an elongated flexible tape illustrated in FIGS. 1 and 4 at 46 is provided and has a hook member 48 formed on one end thereof that is adapted to be inserted between the teeth of the gear 44, as shown in FIG. 4, whereupon rotation of the gear 44 will wind the tape 46 thereon. The opposite end of the tape 46 has a latch 47 secured thereto, as shown in FIG. 1, and this latch 47 is adapted to be secured to a fixed elevated support such as, for example, the hook 49, when the unit is lifted to the upper position.

It will be understood that the purpose of moving the unit 10 to the elevated position as represented by the hook 49 is to provide a lifting device for lifting or elevating door sections as they are built one upon the other in the assembly of an overhead door assembly.

Referring now to FIGS. 1 through 4, the use of the device 10 as a lifting unit is illustrated and, as shown, is adapted to elevate door sections for interconnection in a door opening as defined by a door frame represented by a top beam 50 and a side frame member 51. In order to move the unit to the elevated position, the flexible tape 46 is first unwound from the gear 44 a sufficient amount to permit the latch 47 to be locked to the elevated support as represented by the hook 49. At this point the unit 10 is disposed at ground level, and the flexible tape 46 extends through the ring 34 and bears against the cross bar 38 as indicated in FIG. 1. The motor 12 is then energized, and the tape 46 is wound on the gear 44 as the gear 44 is rotated by the shaft 42. Since the tape 46 is fixed to the elevated support 49, as the tape winds on the gear 44, the device will be lifted upwardly toward the top beam 50. The eyelet through which the tape 46 extends, as defined by the cross bar 38 of the ring 34, maintains the tape in aligned relation and insures that the unit is balanced, while the weight of the unit further helps to maintain the tape taut. Since the motor 12 and speed reducer 14 are located in balanced relation with respect to the gear 44, the unit is lifted to the elevated support 49 in substantially a horizontal position as indicated in FIG. 1 as the tape 46 winds on the gear 44.

When the unit reaches the elevated support, it is fixed thereto by rotating it on its axis until the ring 36 is located adjacent to the support as represented by the hook 49. The latch 47 is then removed from the hook 49 and the ring 36 is slipped onto the hook 49 as indicated in FIG. 3. With the unit mounted at the fixed position on the elevated support 49, it may then be employed as a lifting device for moving loads to and from the elevated position. In this connection, rotation of the gear 44 will wind or unwind the tape 46 thereon, and it is seen that loads as represented by overhead door sections can be lifted to the required assembly position.

After the door sections have been mounted in place in vertical relation to complete the assembly of the overhead door unit, it is necessary to locate a tension spring 52 on the upper end of the door frame and then to tension the spring 52 so that the door assembly will operate in the required manner. Although not shown, bearing and pulley units are fixed to the side frame members of the door at the uppermost end thereof, and mounted in the bearings is a spring shaft indicated at 53 in FIG. 7. In the assembled door the tension spring 52 is adapted to be secured to the spring shaft 53 and as the door assembly is moved on its tracks, the tension spring 52 will act to positively move the door assembly to the open or closed position thereof as required. Heretofore, the tension spring 52 as employed in an overhead door assembly was wound to the required tension by hand after the mounting thereof at the elevated position on the door frame. The present invention avoids the laborious hand winding operation of the tension spring 52 and incorporates an adapter generally indicated at 54 with the unit 10 for performing the spring winding operation. Referring now to FIGS. 5 and 6, the adapter 54 is illustrated and includes a generally cylindrical head portion 55 to which a body portion 56 is joined. Mounted on the body portion 56 are side plates 57 that define pockets 59 for receiving the plates 22 when the adapter 54 is united with the unit 10 as will be described. Journaled for rotation within the body portion 56 is a gear 58 to which a gear 60 is drivingly connected, the gear 60 also being mounted for rotation within the body portion 56 and having a one-to-one ratio with respect to the gear 58. As further illustrated in FIG. 5, a gear 62 is mounted for rotation within the head portion 54 of the adapter 54 and engages the gear 60, the ratio between the gear 62 and gear 60 being approximately 2:1. Formed in the gear 62 is an opening 64 in which a keyway 66 is provided, the opening 64 being adapted to receive the spring shaft 53 therethrough, and the keyway 66 being operative to lock the gear 62 on the spring shaft 53. Prior to mounting of the adapter 54 on the spring shaft 53, the adapter is secured in place on the unit 10 by sliding the plates 22 into the pockets 59 as formed on the sides of the body portion 56. As described, each of the plates 22 is provided with an opening 24 therein, and a lock pin 67 (FIG. 7) is secured to the body portion 56 of the adapter and projects into the opening 24 of the adjacent plate 22 for locking the adapter to the unit 10 when the plates 22 are inserted into the pockets 59. Since the adapter 54 is symmetrical in construction, it may be mounted on the plates 22 in either direction and without regard to location of the lock pin 64, since the lock pin 64 will extend through an appropriate opening in the body portion 56 and will be received in the opening in either of the plates 22 to lock the adapter 54 on the unit 10. It is seen that when the adapter 54 is mounted in position as indicated in FIGS. 5 and 6, operation of the motor 12 will cause the shaft 42 to drive the gear 44, which in turn imparts rotation to the gear 62 through the intermediate gears 58 and 60. It is understood that the relatively large gear 62 will be rotated at substantially a slower speed than that of the gear 44.

When it is necesary to tension the spring 51, and after the adapter 54 has been mounted on the plates 22 of the unit 10 and locked in position thereon, the adapter 54 is slipped on the spring shaft 53 by sliding the shaft 53 through the opening 64 that projects through the head portion 55 and the gear 62. Since the gear 62 is provided with the keyway 66 that is adapted to engage a key formed on the spring shaft 53, a positive locking action of the gear 62 on the shaft 53 is produced. Additional lock bolts that extend through a hub of the head portion 55 may also be used to lock the adapter 54 to the spring shaft 53. As seen in FIG. 6, the unit as mounted on the shaft 53 is located closely adjacent to the frame side member 51 of the door frame on which the door assembly is located. Thus, when the combination device as defined by the motor 12, speed reducer 14 and housing or frame associated therewith is suspended from the shaft 53 through the adapter 54, the unit 10 will engage the frame side member 51 of the door frame. It will be seen that as the spring 52 is tensioned, the unit 10 will positively engage the frame member 51 and will prevent the combination device from rotating on the shaft 53 during the tensioning operation. With the combination unit mounted in place as illustrated in FIG. 6, the motor 12 is energized, which then causes the gear train in the adapter 54 to operatively rotate the shaft 53. Since one end of the tension spring 52 is secured to the shaft 53 and the other end is locked in an end track of the door assembly the spring will be tensioned as the shaft 53 rotates. When the spring 52 has been rotated to the proper tension, the adapter 54 is removed from the shaft 53, and the shaft 53 is securely mounted in its bearings and the door is ready for operation in the conventional manner.

In summarizing the use of the device, the portable unit 10 is first located in an elevated position so that the door sections of an overhead door assembly may be assembled in vertical relation to build up the door assembly. This is accomplished by fixing the end of the tape 46 to the elevated hook 49 and then retracting the tape 46 on the gear 44 until the device is disposed at the elevated position. The ring 36 is then secured to the elevated hook support 49 and the device is operable to wind and unwind the tape 46 for lifting the door sections to the assembled position. After the assembly of the door sections, the adapter 54 is mounted in place on the unit 10 and the combination device is then fixed to the spring shaft 53. Operation of the combination device produces a rotation of the shaft 53 that tensions the spring 52 in the required manner.

Figure 12:
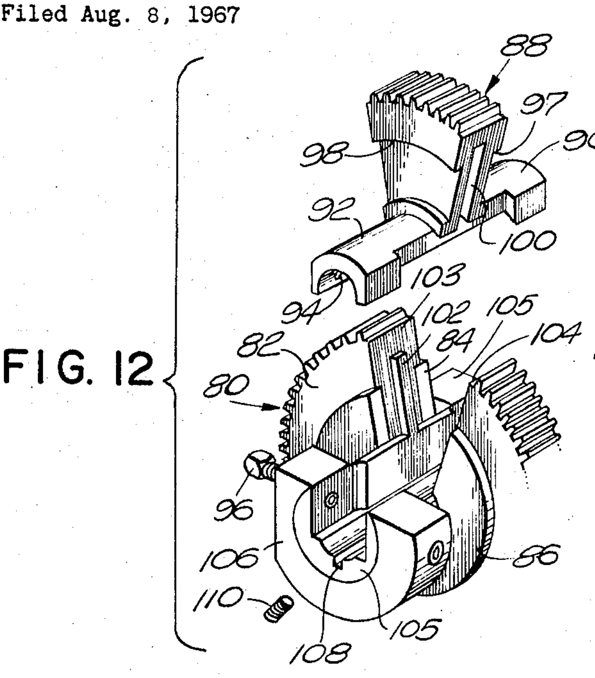
FIG. 12 is a perspective view of a gear member employed in the modified adapter wherein a removable segment portion is illustrated as removed therefrom.

Referring now to FIGS. 8 through 14, a modified form of the adapter is illustrated and is generally indicated at 70. The adapter 70 has a shape and configuration similar to the adapter 54 and includes a head portion 72 to which a body portion 78 is joined, the body portion having side pockets 75 for receiving the plates 22. Enclosed within the body portion 74 and journaled for rotation therein are gears 76 and 74 that are drivingly connected to the gear 44. Located in the head portion 72 and interengaging the gear 74 is a gear member generally indicated at 80 that provides for mounting of the combination unit intermediate of the ends of the spring shaft 53. The gear member 80 includes a main gear portion 82 that is formed with circular grooves on the side faces thereof, horseshoe-like bearing rings 84 and 86 being slidingly received in these grooves. The bearing rings 84 and 86 are fixed to the casing of the head portion 72 and provide the means on which the gear member 80 rotates. As shown in FIG. 12, a segment portion generally indicated at 88 is removably mounted in the gear member 80 and cooperates with the main gear portion 82 to form the complete gear member. The segment portion 88 is formed with opposed hubs 90 and 92, the undersurfaces of which are concave in configuration for being received on the spring shaft 53.

Formed in the hubs 90 and 92 are threaded openings 94 that receive bolts 96 therethrough for securing the segment portion 88 to the main gear portion 82, the bolts 96 also serving to lock the gear member 80 to the shaft 53. The faces of the segment portion 88 are formed with slots 97 and 98 that are aligned with the grooves on the side faces of the main gear portion 82 and are adapted to receive the horseshoe members 84 and 86 in bearing relation therein. Also formed in the body of the segment portion 88 are grooves 100 that define a keyway for receiving keys 102 formed on the opposed internal faces 103 and 104, of the body portion 82. Fixed to the main gear portion 82 are opposed hub portions 106 on which hub collars 105 are mounted by means of set screws 110. The bolts 96 also extend through the hub collars 106 and as described above act to lock the gear member on the shaft 53. A keyway 108 is formed on the hub portions 106 and extends through the central opening in the main gear portion 82 for receiving the key that is joined to the spring shaft. It is seen that the segment portion 88 is removably mounted on the main gear portion 82 and is fixed in position thereon by the bolts 96 that extend through the openings 94 formed in the hubs 90 and 92 of the segment portion 88.

Figures 8, 9, 10:
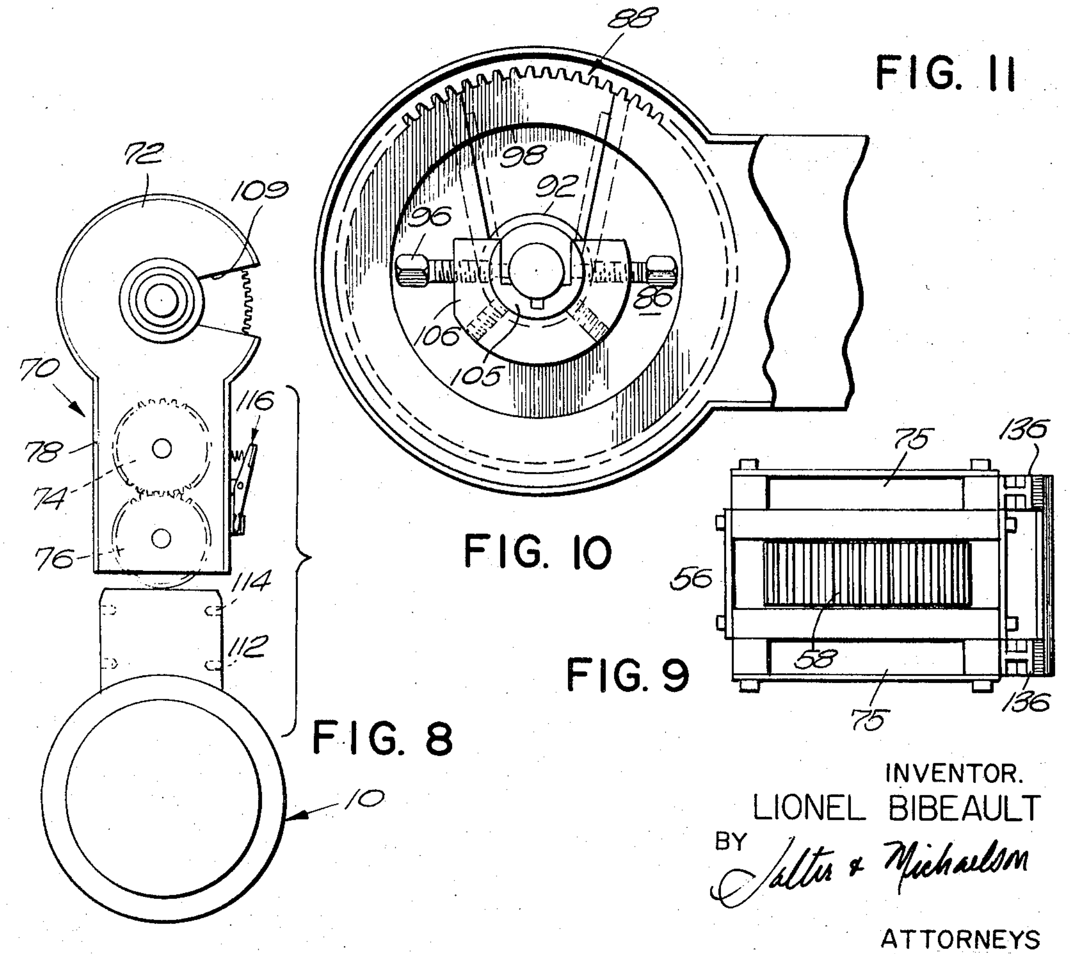
FIG. 8 is an exploded side elevational view showing a modified form of adapter unit as employed with the lifting unit.
FIG. 9 is a bottom plan view of the modified adapter.
FIG. 10 is an enlarged fragmentary view of the modified adapter showing the head portion thereof.

The modified form of the invention as illustrated in FIGS. 8, 10 and 12 is employed when it is not practical to mount the device on the end of a spring shaft such as when space is limited or when it may be more feasible to locate the unit intermediate of two tension springs that are fixed to a relatively large door assembly. Thus, it is seen that the adapter 54 as illustrated in FIGS. 5 and 6 could not be mounted intermediate of the spring shaft 53 but only on the end thereof. In the adapter 70 as illustrated in FIGS. 8, 10 and 12, a slot as indicated at 109 is cut out of the head portion 72 for exposing the segment portion 88 when it is aligned therewith. The segment portion may then be removed from engagement with the main gear portion 82 to expose the interior thereof. With the segment portion 88 removed as indicated in FIG. 9 and with the adapter 70 locked to the unit 10, the combination device may then be mounted on the spring shaft 53 with the keyway 108 receiving the key of the spring shaft therein. The segment portion 88 is thereafter locked in position on the main gear portion 82 by the bolts 96.

Figure 11:
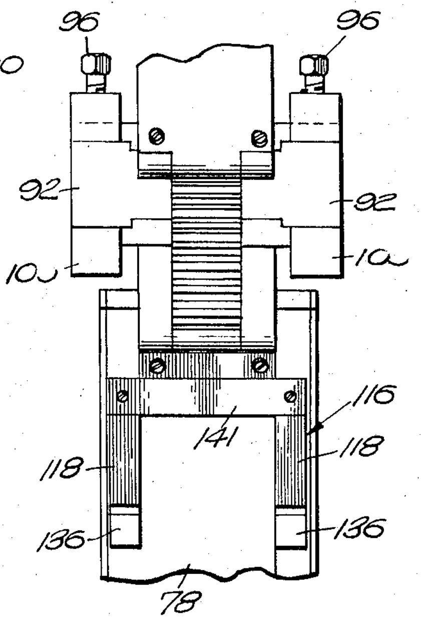
FIG. 11 is an end elevational view of the modified adapter showing the location of a latch mechanism as employed therewith.
Figure 13:
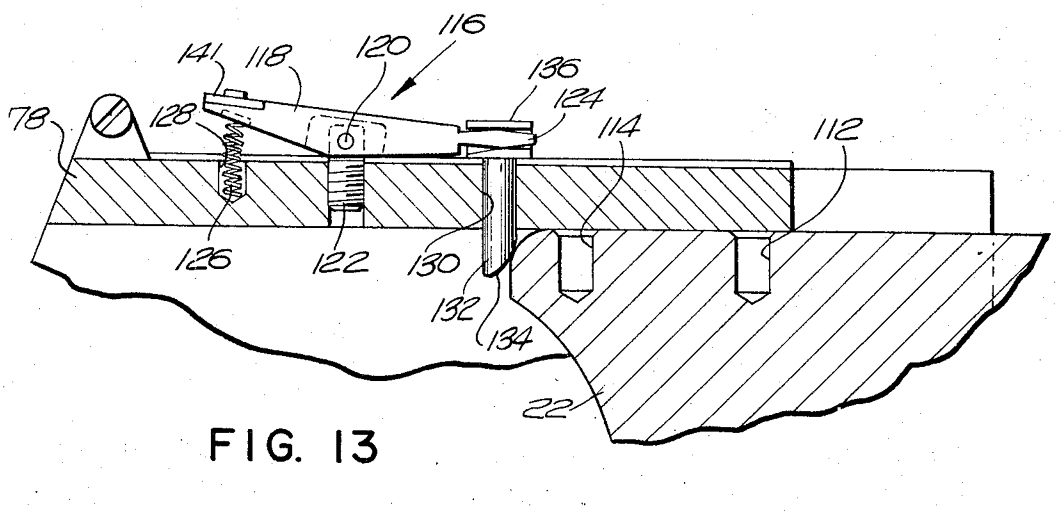
FIG. 13 is a fragmentary sectional view of the modified adapter showing the latch mechanism for securing the adapter on the lifting unit.
Figure 14:
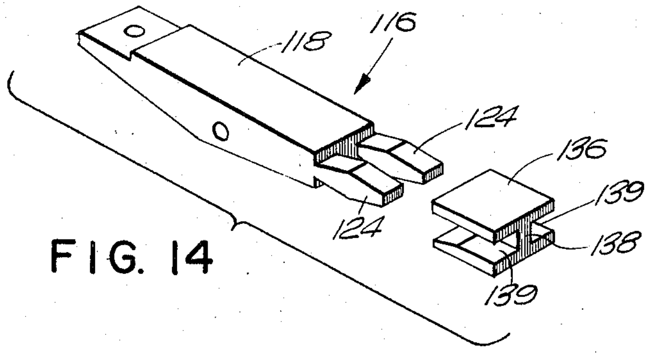
FIG. 14 is an exploded perspective view of a portion of the latch mechanism as illustrated in FIG. 13.
Figure 15:
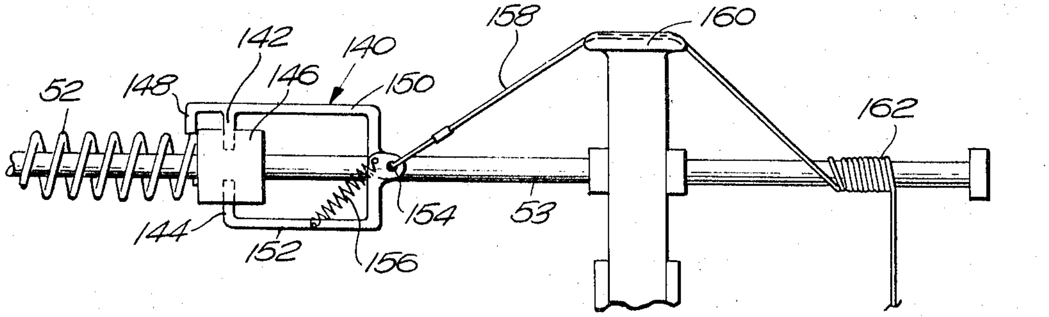
FIG. 15 is an elevational view showing a spring expanding device as associated with the portable device of the present invention.
Figure 16:
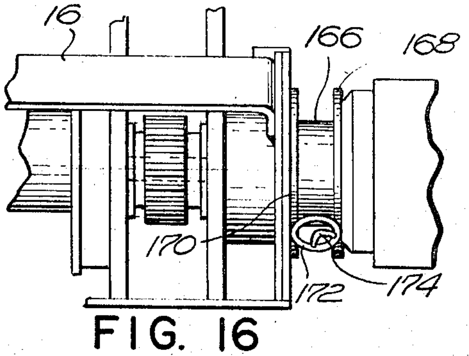
FIG. 16 is a partial elevational view of the lifting unit embodied herein and showing a modified form of rotatable element that is employed in the lifting of the unit to an elevated position and for lifting and lowering loads from the elevated position.

As further shown in FIGS. 11, 13 and 14, the modified adapter 70 includes an automatic latch construction for securing the adapter 70 to the plates 22 of the unit 10. In this connection, the openings 24 which were previously described as being located in the plates 22 are formed in the edges of the plates 22 as indicated at 112, 114 in FIG. 13. The opening 114 defines a preliminary position for receiving a latch to be described for first locating the adapter 70 on the plates 22. When the segment portion 88 has been firmly locked in position in the gear member 80, the adapter 70 is then shifted such that the latch is received in the opening 112.

As illustrated in FIGS. 11, 13 and 14, a latch mechanism is generally indicated at 116 and includes levers 118 one of which is shown in FIG. 13 as being pivotally monted at 120 on a screw 122. Extending outwardly of each lever 118 are spaced fingers 124, a spring 126 being disposed in a hole 128 formed in the body portion 78 of the adapter 70 and being secured to the rearmost end of the lever 118. It is seen that the spring 126 normally locates each lever 118 in the position as indicated in FIG. 13, the lever 118 having a tapered rear portion that provides for depressing of the spring 116 to elevate the fingers 124. Interconnecting the levers 118 is a bar 141 which as shown in FIG. 11 spans the width of the head portion 78 and provides for simultaneous movement of the levers 118. Extending through openings 130 that project through the wall of the body portion 78 of the adapter 70, are latches 132 one of which is shown in FIG. 13 as having a tapered edge as indicated at 134. Joined to the uppermost end of each latch 132 is a connector element 136 having an interior web 138 that separates grooves 139 into which the fingers 124 project. It is seen that the latch mechanism 116 is operable to locate each latch 132 in either holes 112 or 114 depending upon the position of the adapter 70. When the adapter 70 is initially mounted on the plates 22 of the unit 10, each latch 132 will first snap into a hole 114. The latches 132 are lifted from engagement with the holes 114 by depressing the lever 118; and upon further movement of the adapter 70 on the plates 22, the latches 132 will enter into the holes 112 to lock the adapter 70 in the operative position thereof. When each latch 132 is disposed in a hole 112, the gear 76 is in engagement with the gear 44. It is understood that the openings 112 and 114 define two positions, the first of which provides for locating the adapter 70 in a preliminary position when the combination device is first mounted on the spring shaft 53. After the gear member 80 has been locked to the spring shaft 53, the adapter is then shifted to the second position which interconnects the adapter gear train to the gear 44.

When a spring is first mounted in position in a door assembly of the overhead type, it is usually preconditioned by stretching prior to the tensioning operation. This stretching of the spring is normally required so as to enable the spring to be properly tensioned, and heretofore the stretching of the spring has been performed by hand. As illustrated in FIG. 12, the unit incorporating an adapter therewith is also employed for stretching a tension spring and for this purpose incorporates a clamp member generally indicated at 140. The clamp member includes a frame having opposed fingers 142 and 144 that are adapted to be received in grooves formed in a block 146. A finger 148 is also joined to the frame and is spaced from the finger 142 to engage an adjacent face of the block 146. Arms 150 and 152 that are formed as part of the frame carry the fingers thereon, the arm 152 being pivotal with respect to the arm 150 at the pivot point 154. A spring 156 acts to normally maintain the arm 152 in the closed position when the frame is located as illustrated in FIG. 12 so as to maintain the fingers 142, 144 in the grooves of the block 146. A cord 158 is interconnected to the stretching device 140 and extends over the uppermost end of the adapter through a grooved head element 160. The cord may then be tied to the spring shaft as indicated at 162, and upon operation of the device the spring shaft 53 is rotated to wind the cord 162 thereon. As the cord 162 winds on the spring shaft and with the spring disconnected from the spring shaft, the stretching device 140 is moved to the right as illustrated in FIG. 12 to stretch the spring 52.

As previously described in connection with the use of the device as a lifting unit, the gear 44 was employed in combination with the tape 46 for moving the required loads to and from an elevated position. When the device is used to wind a spring, the tape 46 is normally removed from the gear 44 by extracting the hook member 48 from engagement with the gear 44. In order to avoid the removal of the tape 46 from the unit and to allow this tape to remain as a part of the unit regardless of the operation thereof, a modified form of winding element is employed, as indicated in FIG. 3. In this connection, a reel 166 is drivingly connected to the shaft 42 and has mounted between opposed flanges 168 and 170 thereof, a ring 172 having a cross bar 174 joined thereto. It is seen that a tape may be permanently wound on the reel 166, and upon rotation of the shaft 42 the reel 166 will rotate to wind or unwind the tape therefrom. With the reel 166 located in the position as illustrated in FIG. 13, rebalancing of the device may be required, although it has been found that even with the reel 166 located as indicated, and with the tape extending through the eyelet as defined by the cross bar 174, balancing of the unit has been obtained by properly locating the eyelet with respect to the reel. It is seen that the reel 166 defines a rotatable element and is the equivalent of the rotatable element as defined by the gear 44 when the gear 44 is employed to wind the tape thereon as previously described. The operation of the device with the reel 166 mounted thereon is identical as previously described.

While there is shown and described herein certain specific structure embodying the invention, it will be manifested to one skilled in the art that various modifications and rearrangements of the parts may be made without departing from the spirit and scope of the underlying inventive concept, and that the same is not limited to the particular forms herein shown and described.

What is claimed is:

1. In a portable device, a lifting unit including a frame, a drive assembly mounted in said frame and including a drive shaft, a rotatable element interconnected to said drive shaft for rotation thereby, an elongated flexible tape normally wound on said rotatable element and including a free end to which a mounting member is joined, said flexible tape being extendable from said rotatable element to provide for securement of said mounting member to a fixed elevated support while said unit is located at a ground level position, said drive assembly further including drive means that is interconnected to said drive shaft for imparting a driving rotation thereto and to said rotatable element, wherein the flexible tape as extended is rewound on said rotatable element, thereby elevating said unit toward said fixed support from said ground level position, a spring winding adapter mountable on said lifting unit to define a winding device and including gear means that is drivingly interconnected to said drive assembly so as to be driven thereby, said gear means including a drive gear that is receivable in keyed relation on a shaft of a spring that is to be wound, said portable device being removable from the elevated support for mounting on the spring shaft, wherein rotation of said drive shaft is translated into winding motion of said spring through said gear means.

2. In a portable device as set forth in claim 1, said frame having spaced parallel plates joined thereto and said adapter being receivable on said parallel plates in locking relation for mounting said adapter on said lifting unit.

3. In a portable device as set forth in claim 1, said drive gear having a segment removably secured thereto, whereby removal of said segment exposes the interior of said drive gear so that said drive gear is mountable on the spring shaft intermediate the ends thereof.

4. In a portable device as set forth in claim 1, said adapter including a housing in which said gear means is mounted, said housing having a head portion in which said drive gear is located and a body portion in which intermediate gearing interengaged with said drive gear is located, said intermediate gearing being interengageable with said drive assembly when said adapter is mountable on said lifting unit.

5. In a portable device as set forth in claim 4, said frame having spaced, parallel plates projecting outwardly therefrom that are receivable in the body portion of said adapter, an opening formed in at least one of said plates, and a lock element secured to said body portion and being receivable in said opening for locking said adapter on said frame.

6. In a portable device as set forth in claim 1, a spring expanding member interconnected to said spring when said spring is disengageable from said spring shaft but is located in mounted relation thereon, and a pull member engageable with said spring expanding member and with said spring shaft and responsive to rotation of said spring shaft by said winding device to pull said spring in an expanding action, wherein said spring is preconditioned for the winding operation thereof.

7. In a portable device, a frame, a drive assembly mounted in said frame and including a drive shaft, a rotatable element interconnected to said drive shaft for rotation thereby, and a winding adapter for tensioning a spring normally located externally of said device, said adapter being removably mounted on said frame and including gear means that is drivingly interconnected to said drive assembly so as to be driven thereby, said gear means including a drive member that is receivable in engaging relation on a shaft that is received within the externally located spring that is to be wound, wherein rotation of said drive shaft is translated into winding motion of said spring through actuation of said gear means and rotation of said drive member and spring shaft.

8. In a portable device as set forth in claim 7, said drive member having a segment removably secured thereto, whereby removal of said segment exposes the interior of said drive member so that said drive member is mountable on the spring shaft intermediate the ends thereof.

9. In a portable lifting and/or spring winding device as set forth in claim 7, a latch member mounted on said winding adapter, said frame including opposed plates on which said winding adapter is mounted, one of said plates having an opening formed therein for receiving said latch member to releasably secure said winding adapter to said frame.

References Cited

UNITED STATES PATENTS

| | | | |
|---|---|---|---|
| 2,111,088 | 3/1938 | Byers | 74—451 |
| 2,335,568 | 11/1943 | Lock | 254—168 |
| 3,105,652 | 10/1963 | Becker | 254—168 |
| 3,309,064 | 3/1967 | Muller | 254—168 |
| 3,310,290 | 3/1967 | Workman | 254—168 |

RICHARD E. AEGERTER, *Primary Examiner.*

HARVEY C. HORNSBY, *Assistant Examiner.*

U.S. Cl. XR

74—451; 185—40; 242—107.7